United States Patent [19]

Sawada et al.

[11] 4,257,364
[45] Mar. 24, 1981

[54] METHOD AND SYSTEM FOR CONTROLLING IGNITION TIMING

[75] Inventors: Daisaku Sawada; Takashi Shigematu; Yuji Takeda, all of Shizuoka, Japan

[73] Assignee: Toyota Jidosha Kogyo Kabushiki Kaisha, Toyota, Japan

[21] Appl. No.: 39,679

[22] Filed: May 16, 1979

[30] Foreign Application Priority Data

May 19, 1978 [JP] Japan .................................. 53-60276

[51] Int. Cl.³ .............................................. F02P 5/04
[52] U.S. Cl. ..................................... 123/425; 123/416
[58] Field of Search ............ 123/117 R, 117 D, 148 E

[56] References Cited

U.S. PATENT DOCUMENTS

| | | | |
|---|---|---|---|
| 4,002,155 | 1/1977 | Harned et al. | 123/148 E |
| 4,061,116 | 12/1977 | Saida et al. | 123/117 D |
| 4,120,272 | 10/1978 | Douaud et al. | 123/117 D |
| 4,133,475 | 1/1979 | Harned et al. | 123/117 D |
| 4,153,020 | 5/1979 | King et al. | 123/117 R |

*Primary Examiner*—Tony M. Argenbright
*Attorney, Agent, or Firm*—Cushman, Darby & Cushman

[57] ABSTRACT

Method and system for controlling ignition timing includes the steps of and means for discriminating when the time interval between knocking indicative signal pulses is shorter than a particular time period, and controlling ignition timing at a rate related to the frequency of occurrence of knocking to prevent the knocking from occurring. A pulse train is generated having an interval shorter than that of the knocking signal pulse train when the interval of the knocking signal pulse is shorter than the particular time period. The generated pulse train is fed to a control circuit for determining the time by which ignition pulses should be delayed.

14 Claims, 3 Drawing Figures

METHOD AND SYSTEM FOR CONTROLLING IGNITION TIMING

BACKGROUND OF THE INVENTION

1. Field of the Invention

The present invention relates to a method and system for delaying ignition timing when knocking is detected.

2. Prior Art

Heretofore, there has been known the so-called feedback control method for ignition timing wherein the ignition timing is set at the optimum position when knocking is not detected and the ignition timing is delayed when knocking is detected, for example, in Japanese Patent Application Laid-Open (Kokai) No. 87537/77 or Japanese Patent Application Laid-Open (Kokai) No. 46606/76. The method of feedback controlling ignition timing as described above is disadvantageous in that, if the stability in ignition timing is improved, then the response in transient conditions becomes unsatisfactory. Thus, for example, frequent strong knocking cycles take place before ignition timing stabilizes when quick acceleration is effected from a low load condition (the condition where the throttle is fully closed).

SUMMARY OF THE INVENTION

One object of the present invention is to provide a method and system for controlling ignition timing wherein the frequency of knocking is detected by simple means, and used to increase the speed of response in controlling ignition timing during transient conditions, thereby improving the response during transient conditions.

The method and system for controlling ignition timing according to the present invention comprises the steps and means of:

discriminating if the time interval of the knocking signal pulse which has been generated is shorter than a predetermined time or predetermined crankshaft angle; and generating a pulse train having an interval shorter than that of the knocking signal pulse train when the interval of the knocking signal pulse is discriminated to be shorter than the predetermined time or crankshaft angle, and feeding said generated pulse train to a control circuit for determining the value of delay in ignition pulse.

The provision of the discriminating step and means makes it possible to effect controlling in ignition timing meeting to the frequency of knocking to prevent the knocking from occurring. Furthermore, the provision of the step and means of generating the pulse train makes it possible to quickly respond to effect the ignition timing meeting the frequency of knocking.

DETAILED DESCRIPTION OF THE INVENTION

Detailed description will hereunder be given of the present invention with reference to the embodiments thereof.

Figure 1:
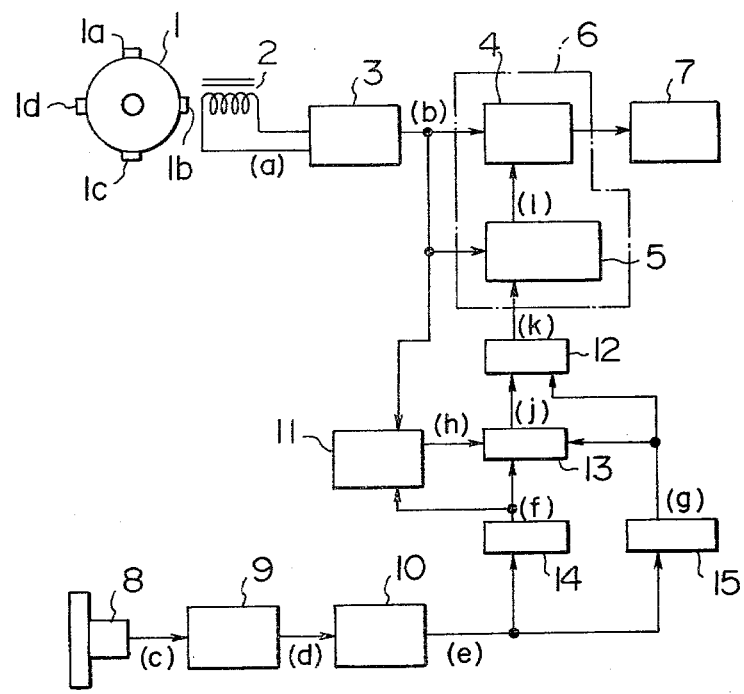
FIG. 1 is a block diagram showing the electric circuit in the system of controlling ignition timing embodying the present invention.

In FIG. 1, a pulse rotor 1 provided at the marginal portion thereof with a required number of projections $1a \sim 1d$ is rotated by a crankshaft of an engine as well known, and mounted in a manner to be rotatable in the direction of advance by a centrifugal advance mechanism, vacuum advance mechanism or the like. Designated at 2 is a pickup for taking out the ignition pulse, 3 a circuit for shaping the waveshape of the ignition pulse. Said pulse rotor 1, pickup 2 and waveshape shaping circuit 3 constitute an ignition pulse detection circuit. Output pulses from the waveshape shaping circuit 3 are adapted to be both an ignition timing calculation circuit 4 in a delay control circuit 6 and a knocking frequency discriminating circuit 11. Delay control circuit 6 also includes an updown counter 5, or the like. Said ignition timing calculation circuit 4 generates a pulse in which the ignition pulse fed from the waveshape shaping circuit 3 is delayed by a value proportional to the output from the updown counter 5, and the arrangement of circuit thereof is well known, and hence, detailed description thereof will be omitted. Denoted at 7 is an output circuit for sending out a pulse emitted from the ignition timing calculation circuit 4 as an ignition pulse. Said knocking frequency discriminating circuit 11 counts pulses fed from the waveshape shaping circuit 3 and sends out a pulse per two counts of pulses before a reset signal is fed from a monostable multivibrator 14. A knocking sensor 8 detects, for example, vibrations of the main body of engine or sound waves caused by said vibrations and transduces them into electric signals. A filter 9 is a band pass filter for allowing the output signal from the sensor 8 within the knocking frequency band to pass therethrough. Denoted at 10 is a knocking discriminating circuit, detects the output signal from the filter 9 having a magnitude over a certain value as the knocking signal, and sends out the detected pulse in a rectangular waveshape. Said sensor 8, filter 9 and knocking discriminating circuit 10 constitute a knocking detecting circuit. A monostable multivibrator 14 sends out a pulse narrower in pulse width at its rise than a rectangular wave fed from the knocking discriminating circuit 10, feeds said pulse to the knocking frequency discriminating circuit 11 as a reset signal, and also feeds said pulse to a switching circuit 13. A monostable multivibrator 15 sends out a pulse narrower in pulse width at its rise than a rectangular wave fed from the knocking discriminating circuit 10, feeds said pulse to the switching circuit 13, and also feeds said pulse to an "OR" circuit 12. Said switching circuit 13 is of an arrangement that it is turned "ON" upon receiving a pulse from the monostable multivibrator 15, thereafter, passes therethrough a pulse fed from the monostable multivibrator 14, and it is turned "OFF" upon receiving a pulse from the knocking frequency discriminating circuit 11, thereafter, does not pass therethrough a pulse fed from the monostable multivibrator 14. The "OR" circuit 12 is adapted to feed the output pulses from the monostable multivibrator 15 and switching circuit 13 to the updown counter 5. Said "OR" circuit 12, switching circuit 13, monostable multivibrator 14 and monostable multivibrator 15 constitute a knocking signal pulse output circuit. Said updown counter 5 receives a pulse from the waveshape shaping circuit 3 as the reference pulse, while, receives a pulse from the "OR" circuit 12 as the up input, and feeds a count output corresponding to the difference between said two inputs to said ignition timing control calculation circuit 4.

Figure 2:
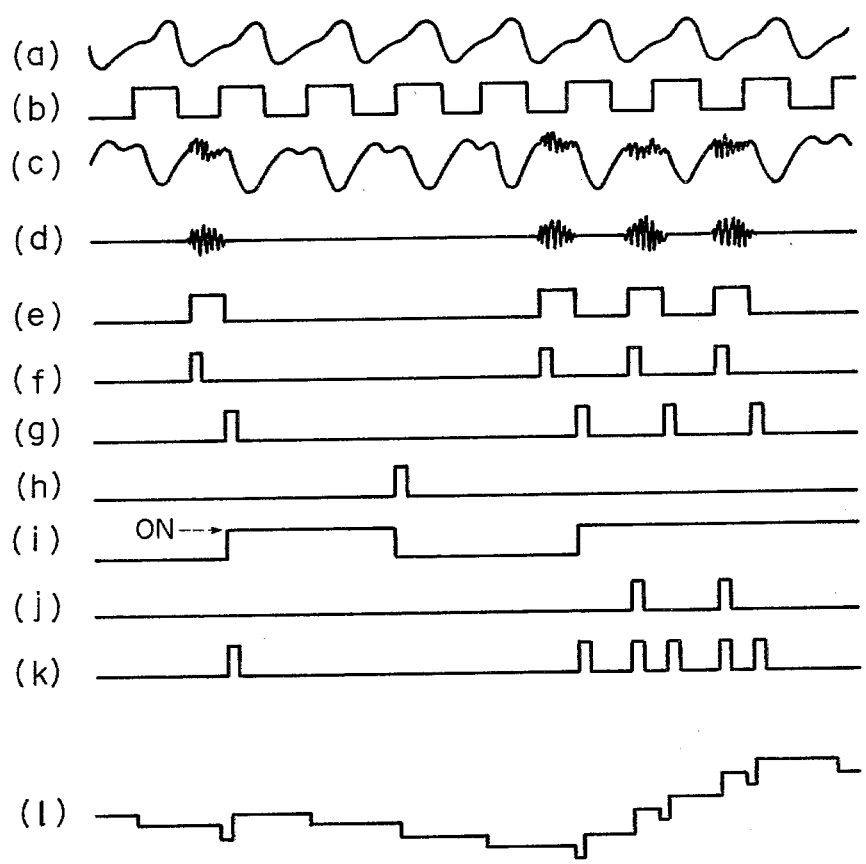
FIG. 2 is a view showing the output signal waveshapes of the respective portions in the above-described block diagram showing the electric circuit.

FIG. 2 shows the waveshapes of outputs from the above-described circuits. More particularly, indicated at a is the signal waveshape of output from the pulse pickup 2, b from the waveshape shaping circuit 3, c from the knocking sensor 8, d from the band pass filter 9, e from the knocking discriminating circuit 10, f from the monostable multivibrator 14, g from the monostable multivibrator 15, h from the knocking frequency discriminating circuit 11, j from the switching circuit 13, k from the "OR" circuit 12, and l from the updown counter 5, respectively. Additionally, indicated at i is a view showing the operating condition of the switching circuit 13.

Description will hereunder be given of action of said ignition timing control system with reference to FIG. 2. The rotation of engine converts the ignition pulse (Refer to FIG. 2a.) generated in the pickup 2 into a rectangular waveshape (Refer to FIG. 2b.) in the waveshape shaping circuit 3. On the other hand, the signal (Refer to FIG. 2c.) detected by the knocking sensor 8 is converted (Refer to FIG. 2d.) through the band pass filter 9, thereafter, transmitted to the knocking discriminating circuit 10, and one rectangular waveshape signal (Refer to FIG. 2e.) of a certain period of time is sent out per ignition cycle involved with a knocking. As against the rise and fall of the knocking signal pulse from the knocking discriminating circuit 10, a rectangular waveshape signal shorter in pulse width than said knocking signal pulse and of a certain period of time is sent out from the monostable multivibrator 14 at the time of rise and from the monostable multivibrator 15 at the time of fall (Refer to FIGS. 2f and 2g.) Upon receiving the output signal from the monostable multivibrator 14 (Refer to FIG. 2f.), the knocking frequency discriminating circuit 11 is reset, and upon being reset, sends out a rectangular waveshape signal (Refer to FIG. 2h.) every two rises of outputs (Refer to FIG. 2b.) from the waveshape shaping circuit 3. On receiving a signal (Refer to FIG. 2g.) from the monostable multivibrator 15, said switching circuit 13 is turned "ON", and, upon receiving an output signal (Refer to FIG. 2h.) from said knocking frequency discriminating circuit 11, turned "OFF". FIG. 2i shows the operating condition of the switching circuit 13 at this time. Consequently, an output signal (Refer to FIG. 2f.) from the monostable multivibrator 14 is converted into one shown in FIG. 2j in accordance with the operation of said switching circuit 13 (Refer to FIG. 2i.) to be fed to the "OR" circuit 12. A logical sum between a signal (Refer to FIG. 2g.) from the monostable multivibrator 15 and a signal (Refer to FIG. 2j.) from the switching circuit 13 is sent out from the "OR" circuit 12 (Refer to FIG. 2k.). The updown counter 5 counts one step up (Refer to FIG. 2l.) in accordance with a rise in a signal (Refer to FIG. 2k.) from the "OR" circuit, and counts one step down (Refer to FIG. 2l.) in accordance with a rise in a signal (Refer to FIG. 2b.) from the waveshape shaping circuit 3. The ignition timing calculation circuit 4 calculates a delay angle in accordance with the value of said count, delays a signal from the waveshape shaping circuit 3 by the value, feeds an ignition timing signal to the ignition output circuit 7 to effect ignition. In this ignition timing control system, the knocking frequency discriminating circuit 11 is reset upon receiving a signal from the knocking discriminating circuit 10, and thereafter, does not feed an "OFF" signal to the switching circuit 13 until a predetermined number of ignition cycles are completed. Consequently, in the case a second knocking signal enters before the number of ignition cycles predetermined by the knocking frequency discriminating circuit 11 are completed after a first knocking signal entered, the "OR" circuit 12 feeds two rectangular waveshape signals to the updown counter 5 per knocking signal. More particularly, in this embodiment, when the knocking signal frequency is high, the knocking signals (Refer to FIG. 2g.) are converted to a pulse train (Refer to FIG. 2k.) narrower in pulse interval. When the knocking signal frequency is low, the updown counter 5 is caused to count one step up per knocking signal, and, when the knocking signal frequency is high, the updown counter 5 is caused to count two steps up per knocking signal. Thus, when the knocking frequency is high, the ignition timing is quickly shifted to the side of delay as compared with the normal case, to thereby improve the transient response in ignition timing during quick acceleration.

Figure 3:
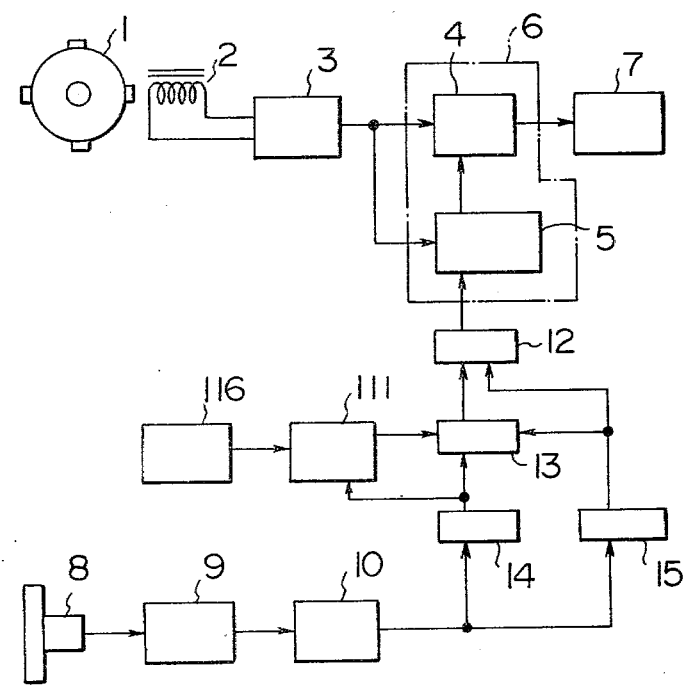
FIG. 3 is a block diagram showing the electric circuit in the system of controlling ignition timing comprising another embodiment of the present invention.

In FIG. 3, an ignition pulse from a pulse oscillator 116 for oscillating at fixed periods is fed to a knocking frequency discriminating circuit 111, instead of an ignition pulse from the waveshape shaping circuit 3. Consequently, this knocking frequency discriminating circuit 111 discriminates the knocking frequency per predetermined period of time. In addition, an ignition pulse from the oscillator for oscillating at fixed periods may be fed to the updown counter 5 as a pulse for the down count, instead of an ignition pulse from the waveshape shaping circuit 3.

What is claimed is:
1. A method for controlling ignition timing, comprising the steps of:
   generating a knocking signal pulse related to the occurrence of knocking in an engine;
   discriminating when the time interval between knocking signal pulses is shorter than a time period;
   generating a pulse train having an interval shorter than that of the knocking signal pulse train when the interval of the knocking signal pulse is discriminated to be shorter than said time period; and
   delaying said ignition pulses by a period related to said generated pulse train and said knocking signal pulse train.
2. A method as in claim 1 wherein said time period is a fixed, predetermined time period.
3. A method as in claim 1 wherein said time period is related to the period of time necessary for the engine to revolve through a predetermined angle.
4. A system for controlling ignition timing, comprising:
   means for generating ignition pulses related to the rotation of an engine;
   means for generating knocking signal pulses related to the occurrence of knocking in an engine;
   first means for comparing the interval between knocking signal pulses with a time period and discriminating therebetween;
   second means for generating a pulse train having an interval shorter than that of the knocking signal pulse train when the interval of the knocking signal pulse is shorter than said time period; and means for delaying said ignition pulses by a period related to said generated pulse train and said knocking signal pulse train.

5. A system for controlling ignition timing as set forth in claim 4, wherein said first means is a counter using a knocking signal pulse as a reset pulse and sending out an output signal upon counting a predetermined number of ignition pulses.

6. A system as in claim 4 wherein said time period is a fixed, predetermined time period.

7. A system as in claim 4 wherein said time period is related to the period of time necessary for the engine to revolve through a predetermined angle.

8. A system for controlling ignition timing as set forth in claim 4, wherein said first means is a counter using a knocking signal pulse as a reset pulse and sending out an output signal upon counting a predetermined number of fixed frequency pulses.

9. A system for controlling ignition timing as set forth in claim 4, 5 or 8, wherein said second means includes a pair of monostable multivibrators, one of which generates a pulse per rise of the knocking signal pulse and the other of which generates a pulse per fall of the knocking signal pulse.

10. A system for controlling ignition timing, comprising:
   an ignition pulse detecting circuit for generating an ignition pulse in accordance with the rotation of an engine;
   a knocking detecting circuit for generating knocking signal pulses related to the occurrence of knocking;
   a knocking frequency discriminating circuit for generating an output pulse per two counts of fixed frequency pulses until it is reset by a knocking signal pulse;
   means for generating delay pulses related to said knocking signal pulses between detection of one of said knocking signal pulses by said knocking detecting circuit and said knocking frequency discriminating circuit output pulse; and
   delay control means for counting said delay pulses and delaying said ignition pulses by a time related to said count.

11. A system for controlling ignition timing, comprising:
   an ignition pulse detecting circuit for generating an ignition pulse in accordance with the rotation of an engine;
   a knocking detecting circuit for generating knocking signal pulses related to the occurrence of knocking;
   a knocking frequency discriminating circuit for generating an output pulse per two counts of said ignition pulses until it is reset by a knocking signal pulse;
   means for generating delay pulses related to said knocking signal pulses between detection of one of said knocking signal pulses by said knocking detecting circuit and said knocking frequency discriminating circuit output pulse; and
   delay control means for counting said delay pulses and delaying said ignition pulses by a time related to said count.

12. A system for controlling ignition timing as set forth in claim 11 or 10, wherein said delay pulse generating means comprises:
   a first monostable multivibrator for generating pulses related to rising edges of said knocking signal pulses;
   a second monostable multivibrator for generating pulses related to falling edges of said knocking signal pulses;
   a switching circuit actuated by said second monostable multivibrator pulses and deactivated by said knocking frequency discriminating circuit output pulses; and
   an "OR" circuit for sending out the logical sum between an output of said switching circuit and that of said second monostable multivibrator.

13. A system for controlling ignition timing as set forth in claim 12, wherein said delay control means comprises:
   an up/down counter for up-counting by said delay pulses and down-counting by said ignition pulses; and
   an ignition timing calculation circuit for calculating the value of delay in ignition timing corresponding to the value of count in said up/down counter and sending out an ignition pulse according to value of calculation.

14. A system for controlling ignition timing as set forth in claim 11 or 10, wherein said delay control means comprises:
   an up/down counter for up-counting by said delay pulses and down-counting by said ignition pulses; and
   an ignition timing calculation circuit for calculating the value of delay in ignition timing corresponding to the value of count in said up/down counter and sending out an ignition pulse according to said value of calculation.

* * * * *